United States Patent
Phillips et al.

(10) Patent No.: US 11,689,625 B1
(45) Date of Patent: Jun. 27, 2023

(54) SYSTEMS AND METHODS FOR FAST START OF APPLICATIONS IN A CLOUD COMPUTING ENVIRONMENT

(71) Applicant: Rovi Guides, Inc., San Jose, CA (US)

(72) Inventors: Christopher Phillips, Hartwell, GA (US); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/728,629

(22) Filed: Apr. 25, 2022

(51) Int. Cl.
| | |
|---|---|
| *G06F 9/48* | (2006.01) |
| *H04L 67/141* | (2022.01) |
| *H04L 67/131* | (2022.01) |
| *H04L 67/1095* | (2022.01) |
| *G06F 9/455* | (2018.01) |
| *A63F 13/355* | (2014.01) |
| *H04L 67/50* | (2022.01) |

(52) U.S. Cl.
CPC .......... *H04L 67/131* (2022.05); *A63F 13/355* (2014.09); *G06F 9/45558* (2013.01); *G06F 9/485* (2013.01); *H04L 67/1095* (2013.01); *H04L 67/141* (2013.01); *H04L 67/535* (2022.05)

(58) Field of Classification Search
CPC . H04L 67/131; H04L 67/1095; H04L 67/141; H04L 67/535; G06F 9/485; G06F 9/45558; A63F 13/355
See application file for complete search history.

(56) References Cited

U.S. PATENT DOCUMENTS

| | | | |
|---|---|---|---|
| 10,452,440 B1 * | 10/2019 | Odulinski | G06F 9/485 |
| 11,526,425 B1 * | 12/2022 | Karis | G06F 11/3452 |
| 11,582,316 B1 * | 2/2023 | Danyi | G06F 16/9566 |
| 2018/0089105 A1 * | 3/2018 | Bain | G06F 12/109 |
| 2019/0191344 A1 * | 6/2019 | Wen | H04W 36/0061 |
| 2021/0168203 A1 * | 6/2021 | Parulkar | H04L 67/1076 |
| 2021/0303597 A1 * | 9/2021 | Zhang | G06F 16/275 |
| 2022/0114055 A1 * | 4/2022 | Doshi | G06F 11/1428 |
| 2023/0023528 A1 * | 1/2023 | Emmanuel | H04L 65/80 |

FOREIGN PATENT DOCUMENTS

| | | | | | |
|---|---|---|---|---|---|
| CN | 105493043 B | * | 3/2019 | | G06F 16/116 |
| CN | 110365787 A | * | 10/2019 | | H04L 67/1008 |
| CN | 107025256 B | * | 5/2020 | | G06F 12/0862 |
| CN | 114465877 A | * | 5/2022 | | |
| WO | WO-2022086610 A1 | * | 4/2022 | | G06F 11/3636 |

* cited by examiner

*Primary Examiner* — Alina A Boutah
(74) *Attorney, Agent, or Firm* — Haley Guiliano LLP

(57) ABSTRACT

An application likely to be accessed at an edge of the cloud computing environment is identified. The identified application is preemptively launched and then placed in a memory-resident state. When a request from a user to access the application is received, the application is brought out of the memory-resident state into an active state and parameters associated with the user are applied to the application.

20 Claims, 10 Drawing Sheets

SYSTEMS AND METHODS FOR FAST START OF APPLICATIONS IN A CLOUD COMPUTING ENVIRONMENT

BACKGROUND

This disclosure is directed to running applications at edges of a cloud computing environment. In particular, techniques are disclosed for fast start of applications when accessed by user devices connected to an edge of the cloud computing environment.

SUMMARY

Many applications are very large in size. For example, game engines and accompanying game data can be several hundred gigabytes. It can take some time to load a game on a game console or PC, resulting in a wait time for the user to start playing the game even when using Solid State Drives (SSDs). This same problem exists when running game engines at the edge of a cloud computing environment for remote game rendering, which will result in long wait times for the game engine to start and begin to render video. As games become even more complex with higher complexity graphics, such as in virtual reality (VR) and augmented reality (AR), this problem will continue to exist and even get worse.

Remote game rendering, also referred to as cloud gaming, is gaining traction by game studios, internet companies and network operators. There are currently products on the market like Google's Stadia™, Nvidia's GeForce Now™ and Sony's PS Now™ that offer remote game streaming and download as a business. Amazon is entering into this business too. "Download" refers to downloading the game to the local hard drive so that the game runs locally on the gaming console or PC. Streaming is referred to as running the game engine somewhere, typically close to the edge for lower latency, in the network and receiving the output of the rendered game, encoding, streaming, and decoding the game on a client device. The controller input is consumed on the local device and delivered over the network to the remote running game engine.

As of today, no Virtual Reality remote/cloud gaming is known to exist. However, companies such as Unity, Sony, Google and Nvidia are eager to offer solutions supporting remote VR and AR gaming in the future, which will increase initial load times even more. These game engines are shut down each time a user/subscriber stops playing the game and are restarted when a the same or a new user/subscriber wants to play the game. Every time a first user stops playing and a second user wants to start playing the same game, the second user experiences long load times.

What is needed is a solution that manages applications (e.g., game engine virtual machines (VMs)) for fast startup based on resource availability as well as loaning out physical processing resources (e.g., GPU resources) for other uses when not in use at the network edge. This is done by leaving very popular applications in a memory-resident state and when a new session is requested for such an application, the application is brought out of the memory-resident state and the requesting user's application data (e.g.,. game state and character data) is loaded into the application. User application data can also be saved and loaded in a remote-rendered environment (e.g.,. a cloud game engine environment) where the user application data is stored in the global cloud with interfaces for loading the user application data and user profile data from the global cloud into the local running application inside of the cloud computing environment, such as an operator's dedicated network running at the edge of a 5G mobile broadband network or any other network. This results in fast application load times for popular applications located at a particular edge of the network as well as the ability to save user application data in a cloud computing environment and use the application's typical means of loading and saving of user application data when the application is rendered locally.

Systems and methods are described herein for fast start of an application in a cloud computing environment. An application likely to be accessed at an edge of the cloud computing environment is identified. This can be accomplished in several ways, including analysis of historical application usage patterns to predict future usage, and probabilistic analyses based on ratios of users that use an application to total number of users connected to the edge. Once an application is identified as likely to be accessed, that application is preemptively launched and then placed in a memory-resident state. For example, the application may be kept in a cached memory space or may be launched in a virtual machine that is then suspended or placed in a hibernated state. When a request from a user to access the application is received, the application is brought out of the memory-resident state into an active state, and parameters associated with the user are applied to the application. For example, a user profile may include customizations or preferences the user has for the application.

Sometimes a user will move between two edges of the cloud computing environment. For example, the cloud computing environment may be a 5G mobile broadband network and the user may be travelling by car, train, or other mode of transportation. It may be determined at the edge whether the user device associated with the application will be connected to a second edge within a threshold period of time. If so, session data for the application associated with the user device is synced with the second edge ahead of the time at which the user device connects to the second edge.

The application in question may not always be active at the second edge before the user device connects to it. If the application is active, a session for the application is started using the synced session data. If the application is not active, the application is launched at the second edge and, like at the first edge, parameters associated with the user are applied to the application. Once the application is launched, a session is started at the second edge using the synced session data.

If it is detected that a user has ended a session for the application, it is then determined whether the application is likely to be accessed by other users. If the application is no longer likely to be accessed by other users, then the application is closed. If, however, other users are still likely to access the application, then it is determined at the edge whether a user device associated with the application at a second edge of the cloud computing environment will be connected to the edge within a threshold period of time. If so, a current state of the application at the second edge is applied to the application, and session data from the second edge is synced with the edge. If no user device associated with the application at the second edge will be connected to the edge within the threshold period of time, then the application is returned to a memory-resident state.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
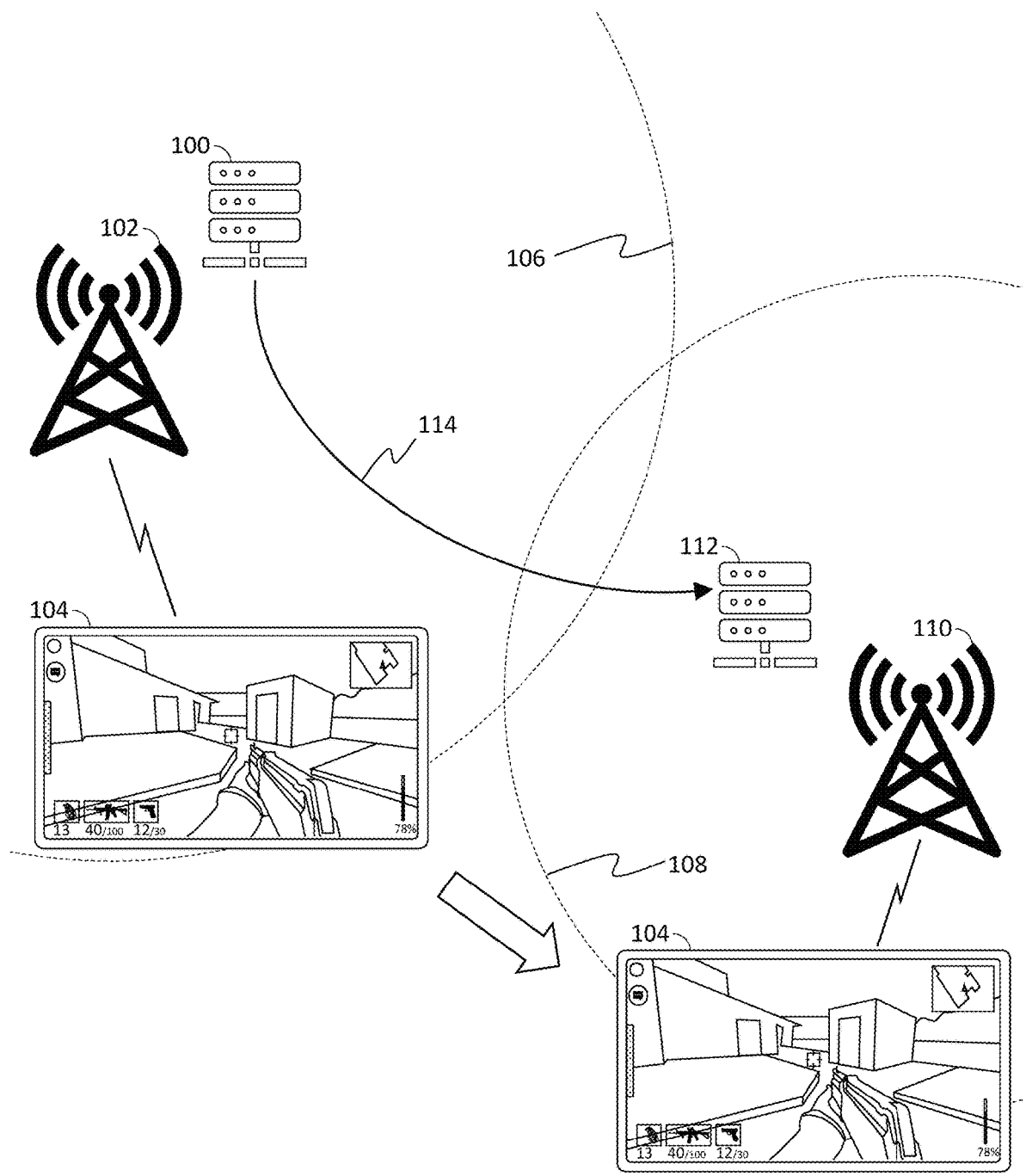
FIG. 1 shows an example of a cloud computing environment in which an application active at a first edge is to be started quickly at a second edge, in accordance with some embodiments of the disclosure.

FIG. 1 shows an example of a cloud computing environment in which an application active at a first edge is to be started quickly at a second edge, in accordance with some embodiments of the disclosure. Edge server 100, which resides at edge 102 of a cloud computing environment, serves cloud-based applications to user devices connected to edge 102. User device 104 may connect to edge 102 and edge server 100 may serve a cloud-based application to user device 104, such as a video game. While this disclosure will mainly discuss cloud-based rendering of video games, one skilled in the art will readily appreciate that the methods and systems described herein are applicable to, and can be used with, all types of cloud-based applications.

Edge 102 may be a first node in a wireless network, such as a 5G mobile broadband network. If the application being served to user device 104 by edge server 100 is one that takes a long time to load initially, it may cause significant lag or buffering for user device 104 when user device 104 moves out transmission range 106 of edge 102. For example, a video game may require loading not only the video game engine, but also level data, music, and user-specific data such as preferences, statistics, scores, etc. In some cases, a video game will completely stall, and the game will not be playable at all until the switch from one edge to the next edge is complete. If user device 104 moves out of transmission range 106 of edge 102 and into transmission range 108 of edge 110, edge server 112, which resides at edge 110, will require significant time to launch the video game and load all the necessary data before the user of user device 104 can continue playing the video game. To prevent this, edge server 100 determines that user device 104 will connect to edge 110 and transmit 114 an instruction to edge server 112 to launch the video game. The transmission may also include user data for the current video game session. Edge server 100 may maintain a link with edge server 112 and continue to provide session data and other game data until the connection between edge 102 and user device 104 is lost. In some embodiments, transmission range 106 may partially overlap with transmission range 108. User device 104 may therefore connect to edge 110 before disconnecting from edge 102 and may transmit session data and other game data to both edge server 100 and edge server 112 until the connection with edge 102 is lost.

Figure 2:
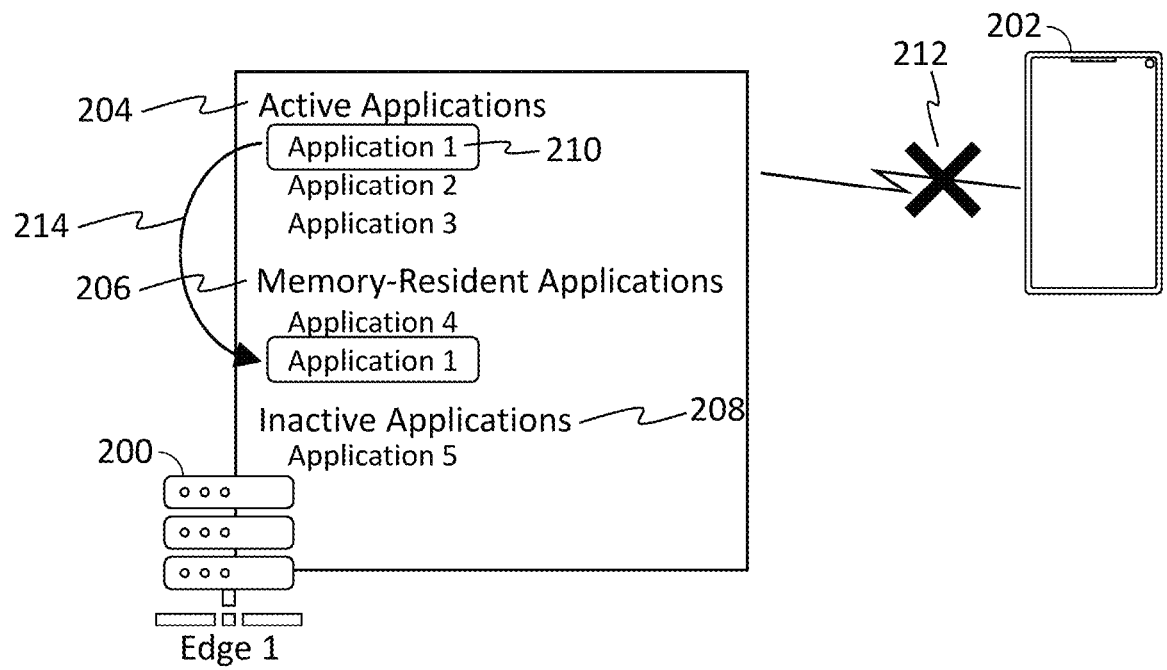
FIG. 2 shows an example of application management at an edge server, in accordance with some embodiments of the disclosure.

FIG. 2 shows an example of application management at an edge server, in accordance with some embodiments of the disclosure. Edge server 200 serves applications to user device 202. To conserve system resources, not all applications available on edge server 200 are kept active at all times. At any given time, there are some active applications 204, some memory-resident applications 206, and some inactive applications 208. User device 202 may access Application 1 210. Since a user device is currently accessing Application 1 210, it is one of several active applications 204. At some point, the connection between user device 202 and edge server 200 is lost 212. This may occur because user device 202 moved outside the transmission range of the network edge at which edge server 200 resides, because user device 202 has been deactivated (by a user, from loss of power, or system failure), or because the user of user device 202 has ended the session for Application 1 210. If no other user device is currently accessing Application 1 210, it is placed 214 in a memory-resident state. For example, a virtual machine in which Application 1 210 runs may be placed in a hibernated or sleep state. This allows for Application 1 210 to be quickly reactivated if user device 202 or any other user device accesses Application 1 210.

Figure 3:
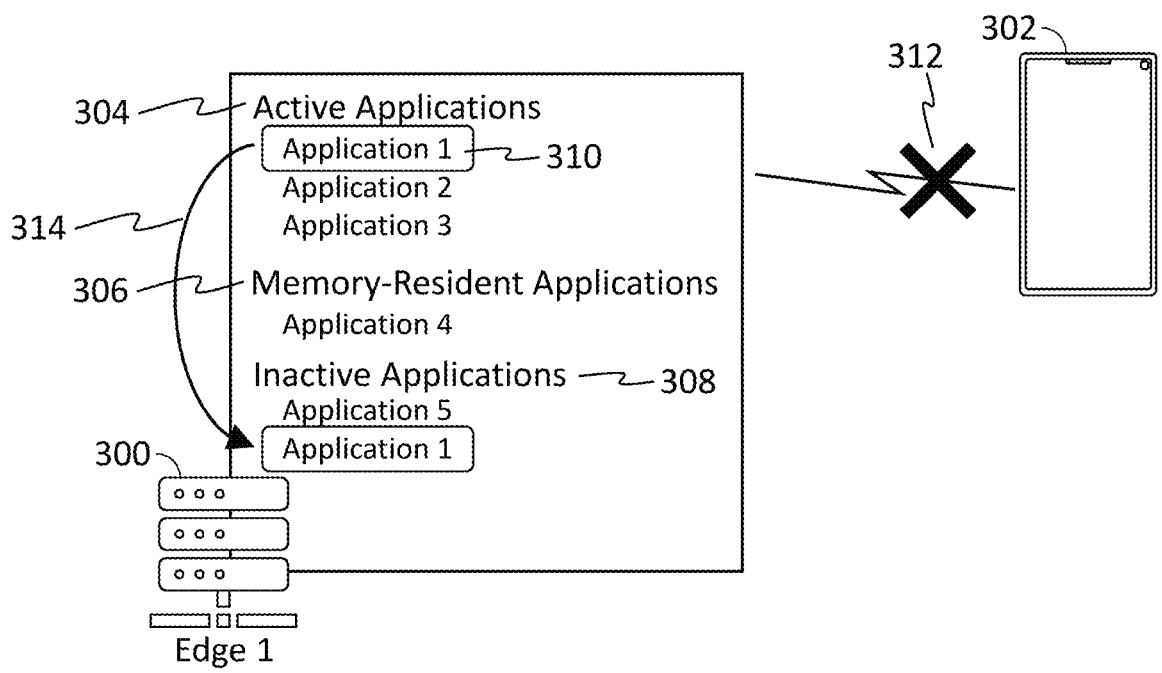
FIG. 3 shows a second example of application management at an edge server, in accordance with some embodiments of the disclosure.

FIG. 3 shows a second example of application management at an edge server, in accordance with some embodiments of the disclosure. Edge server 300 serves applications to user device 302. To conserve system resources, not all applications available on edge server 300 are kept active at all times. At any given time, there are some active applications 304, some memory-resident applications 306, and some inactive applications 308. User device 302 may access Application 1 310. Since a user device is currently accessing Application 1 310, it is one of several active applications 304. At some point, the connection between user device 302 and edge server 300 is lost 312. This may occur because user device 302 moved outside the transmission range of the network edge at which edge server 300 resides, because user device 302 has been deactivated (by a user, from loss of power, or system failure), or because the user of user device 302 has ended the session for Application 1 310. If no other user device is currently accessing Application 1 310 and it is no longer likely that any user device will access Application 1 310, it is placed 314 in an inactive state.

Figure 4:
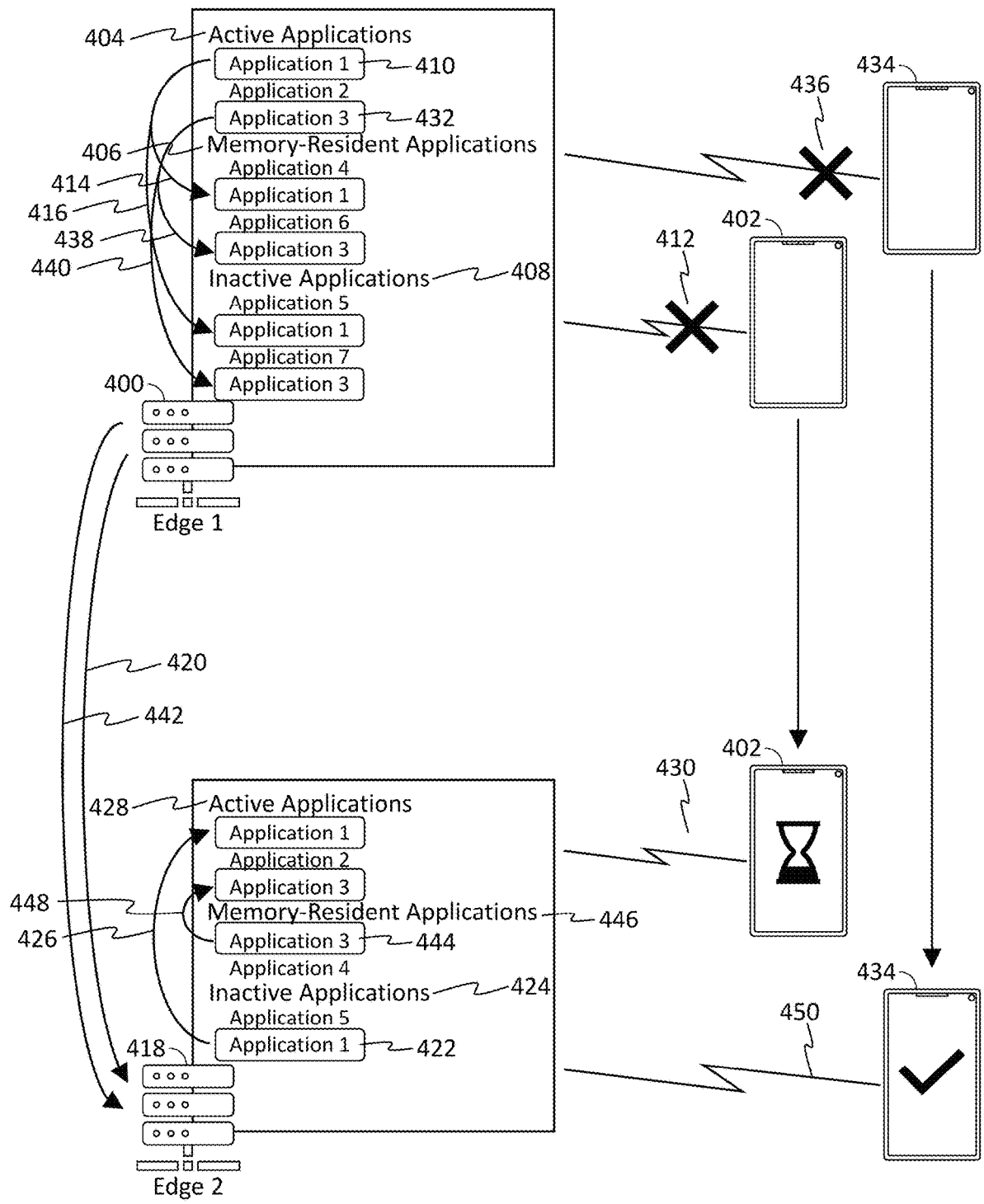
FIG. 4 shows an example of application management between two edge servers, in accordance with some embodiments of the disclosure.

FIG. 4 shows an example of application management between two edge servers, in accordance with some embodiments of the disclosure. Edge server 400 at Edge 1 serves applications to user device 402. To conserve system resources, not all applications available on edge server 400 are kept active at all times. At any given time, there are some active applications 404, some memory-resident applications 406, and some inactive applications 408. User device 402 may access Application 1 410. Since a user device is currently accessing Application 1 410, it is one of several active applications 404. At some point, the connection between user device 402 and edge server 400 is lost 412. This may occur because user device 402 moved outside the transmission range of the network edge at which edge server 400 resides, because user device 402 has been deactivated (by a user, from loss of power, or system failure), or because the user of user device 402 has ended the session for Application 1 410. If no other user device is currently accessing Application 1 410, it is placed 414 in a memory-resident state. For example, a virtual machine in which Application 1 410 runs may be placed in a hibernated or sleep state. This allows for Application 1 410 to be quickly reactivated if user device 402 or any other user device accesses Application 1 410. If no other user device is currently accessing the application, and it is no longer likely that any user device will access Application 1 410, it is placed 416 in an inactive state.

Edge server 400 may determine, prior to loss of connection with user device 402, that user device 402 will be connected to Edge 2 within a threshold period of time. In some embodiments, the transmission range of Edge 1 and Edge 2 may overlap. Edge server 400 may then determine that user device 402 has already connected to edge server 418, which resides at Edge 2, before the connection with edge server 400 is lost. In either case, edge server 400 transmits 420 session information associated with user device 402 and Application 1 410 to edge server 418. In response to receiving the transmission, edge server 418 may determine whether Application 1 is currently active at edge server 418. If Application 1 is not active at edge server 418, edge server 418 determines whether Application 1 is in a memory-resident state. In the example of FIG. 4, Application 1 422 is one of several inactive application 424 at edge server 418. Thus, edge server 418 first launches Application 1 422 and places it in an active state. Edge server 418 must load Application 1 and any related files and receive allocation of sufficient system resources at edge server 418 before Application 1 422 is ready to be served 430 to user device 402.

Edge server 400 also serves Application 3 432 to user device 434. When connection between edge server 400 and user device 434 is lost 436, edge server 400 either places 438 Application 3 432 in a memory-resident state or places 440 Application 3 432 in an inactive state. Similar to management of Application 1 410 discussed above, edge server 400 may transmit 442 session information associated with user device 434 and Application 3 432 to edge server 418 if edge server 400 determines that user device 434 will be connected to, or has already connected to, edge server 418. In response to receiving the transmission, edge server 418 may determine whether Application 3 is currently active at edge server 418. If Application 3 is not active at edge server 418, edge server 418 determines whether Application 3 is in a memory-resident state. In the example of FIG. 4, Application 3 444 is one of several memory-resident applications 446. Thus, edge server 418 brings 448 Application 3 444 out of the memory-resident state and into an active state. Edge server 418 then serves 450 Application 3 444 to user device 434 without having to wait for associated files to be loaded or for allocation of system resources.

Figure 5:
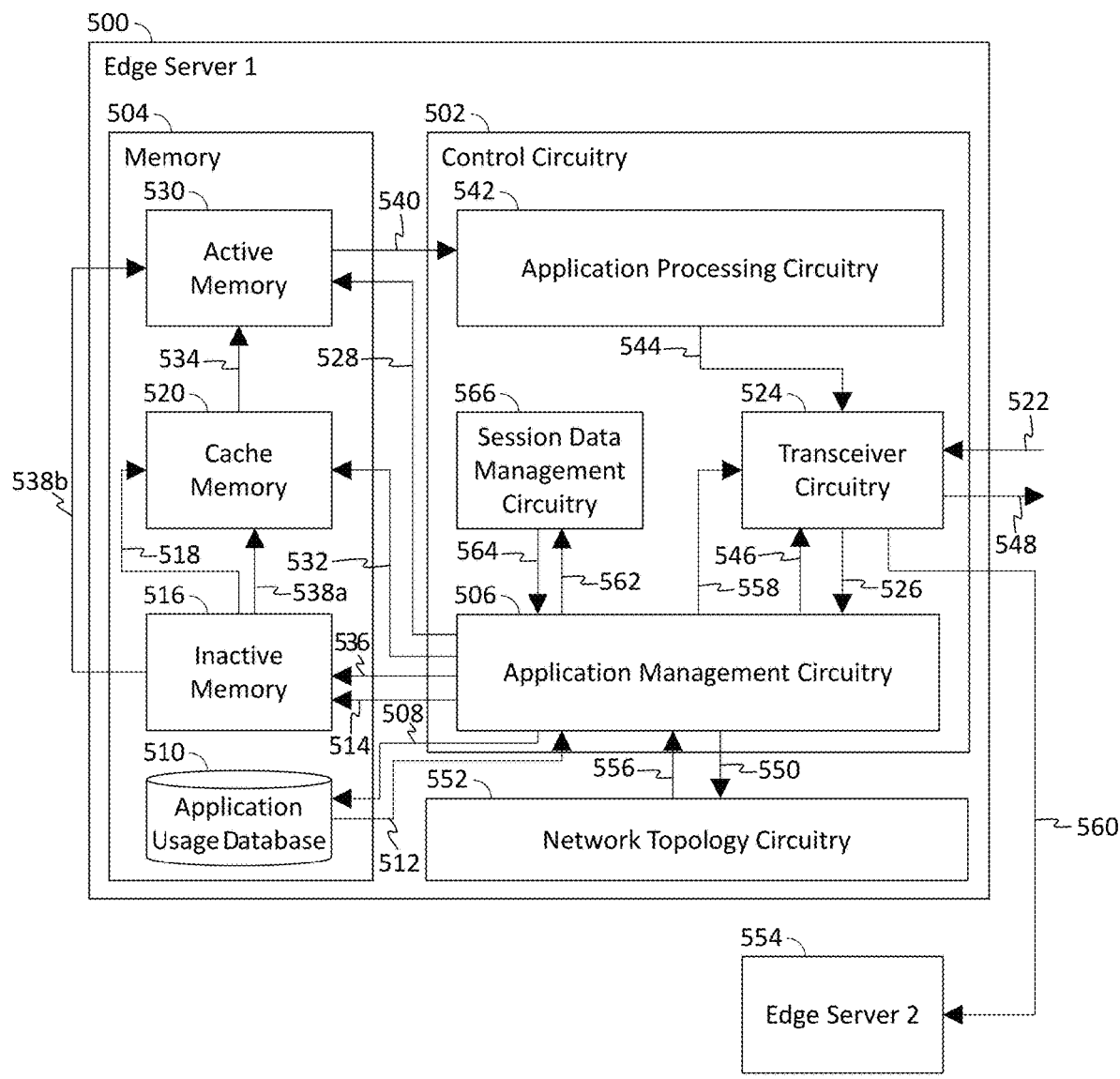
FIG. 5 is a block diagram showing components and data flow therebetween of an edge server on which an application is initially used, in accordance with some embodiments of the disclosure.

FIG. 5 is a block diagram showing components and data flow therebetween of an edge server on which an application is initially used, in accordance with some embodiments of the disclosure. A first edge server 500 resides at a first edge of a cloud computing environment. Edge server 500 includes control circuitry 502 and memory 504. Control circuitry 502 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, one or more of the functions described as being performed by control circuitry 502 or any of its components may be performed by control circuitry residing on another device. For example, the functionality of edge servers in the cloud computing environment, including edge server 500, may be orchestrated by one or more hierarchically superior devices. Memory 504 may be any suitable electronic storage device such as random-access memory, read-only memory, hard drives, optical drives, solid state devices, quantum storage devices, or any other suitable fixed or removable storage devices, and/or any combination of the same.

Control circuitry 502 may, using application management circuitry 506, determine which applications are likely to be accessed at edge server 500. Application management circuitry 506 requests 508 application usage data from application usage database 510. Application usage database 510 may be stored in memory 504 or in a remote server or storage device. Application usage database 510 may include data describing most commonly used applications, times at which each application available at edge server 500 has been most frequently accessed, overall popularity rankings of each available application, and other data related to historical usage of each available application. Application management circuitry 506 receives 512 the requested application usage data from application usage database 510.

Based on the application usage data, application management circuitry 506 may determine which applications are likely to be accessed in several ways. Application management circuitry 506 may compare the current date, day, or time of day with the application usage data to identify applications frequently accessed at the same time of day or on the same day of the week. Application management circuitry 506 may also determines a ratio of the number of user devices that accessed each application, or the number of active instances of each application to the total number of user devices currently connected to edge server 500. Application management circuitry 506 may further take into account historical numbers of user devices connected to edge server 500 to predict a number of user devices that will access each application in the future.

To conserve system resources, application management circuitry 506 may compare the determined or predicted number of user devices that will access an application to a threshold number of user devices. Only if the determined or predicted number of user devices meets or exceeds the threshold number of user devices will application management circuitry 506 determine that the application is likely to be accessed. Furthermore, application management circuitry 506 may only determine applications that are likely to be used within a threshold amount of time from the current time. If application management circuitry 506 determines that an application is likely to be accessed by a threshold number of user devices within the threshold amount of time, application management circuitry 506 determines whether the application is currently active at edge server 500. If the application is not currently active, application management circuitry 506 transmits 514 an instruction to memory 504 to retrieve the application from inactive memory 516 and launch the application. The application is then placed in a memory-resident state and placed 518 in cache memory 520.

Control circuitry 502 receives 522, using transceiver circuitry 524, a request from a user device to access an application. Transceiver circuitry 524 comprises a network connection over which data can be transmitted to and received from remote devices, such as an ethernet connection, WiFi connection, mobile broadband interface, or connection employing any other suitable networking protocol. Transceiver circuitry 524 in turn transmits 526 the request to application management circuitry 506. Application management circuitry 506 identifies, from the request, the specific application requested to be accessed by the user device. For example, the request may include an application identifier (e.g., a name or a unique ID number) that can be extracted from the request. Once the requested application is identified, application management circuitry 506 determines whether the requested application is currently active. Application management circuitry 506 queries 528 active memory 530 to determine whether the application is currently active. If the requested application is not currently active, application management circuitry queries 532 cache memory 520 to determine whether the application is currently in a memory-resident state. If the requested application is currently in a memory-resident state, application management circuitry 506 brings the application out of the memory-resident state and places it 534 in active memory 530. If the application is not currently active and is not currently in a memory-resident state, application management circuitry 506 queries 536 inactive memory 516 to determine whether the application is available on edge server 500. If the application is available, application management circuitry 506 launches the application. Application management circuitry 506 may place 538a the launched application in cache memory 520 while all associated files are loaded and system resources are allocated to the application. Once that process is completed, the application is then placed 534 in active memory. Alternatively, application management circuitry 506 may place 538b the application directly into active memory 530.

Once the requested application is active, application data is transmitted 540 from active memory 530 to application processing circuitry 542. Application processing circuitry 542 may include one or more runtime environments in which various applications can be run. For example, application processing circuitry 542 may be a game engine or a VR rendering engine. Once processed and rendered for output to the user device, the application data is transmitted 544 from application processing circuitry 542 to transceiver circuitry 524. Transceiver circuitry 524 in turn transmits 548 the processed and rendered application data to the requesting user device.

Edge server 500 may monitor connections with each device. If it is determined that the connection between edge server 500 and a user device has been lost, or will soon be lost, edge server 500 may determine that the user device will be connected to, or has already established a connection with, another edge server in the cloud computing environment. Application management circuitry 506 may query 550 network topology circuitry 552 to identify the edge server to which the user device has connected or will soon connect. For example, network topology circuitry 552 may track signal strength between edge server 500 and each user device, as well as movements of each user device. Network topology circuitry 552 may also store or have access to the physical locations of other edge servers in the cloud computing environment. Network topology circuitry 552 may calculate the physical location of a user device by triangulation using the signal strength of the connection between edge server 500 and the user device before a movement is detected and after a movement is detected. Using the physical location of the user device, further movements of the user device inform network topology circuitry 552 of which other edge servers the user device may soon connect with. If the connection between edge server 500 and the user device is lost, network topology circuitry 552 can use the last known physical location and last known direction of travel to determine the most likely edge server to which the user device is now connected.

Once the edge server (e.g., edge server 554) to which the user device has connected or will soon connect has been identified, network topology circuitry 552 transmits 556 an identifier of edge server 554 to application management circuitry 506. Application management circuitry 506 directs a message including an identifier of the application accessed by the user device to edge server 554 and transmits 558 the message to transceiver circuitry 524 which in turn transmits 560 the message to edge server 554. The transmission may also include session data for the application session associated with the user device. Application management circuitry 506 may request 562 and receive 564 the session data from session data management circuitry 566. As will be discussed below in connection with FIG. 6, edge server 554 determines whether the identified application is active at edge server 554 and preemptively launches the application if necessary.

Figure 6:
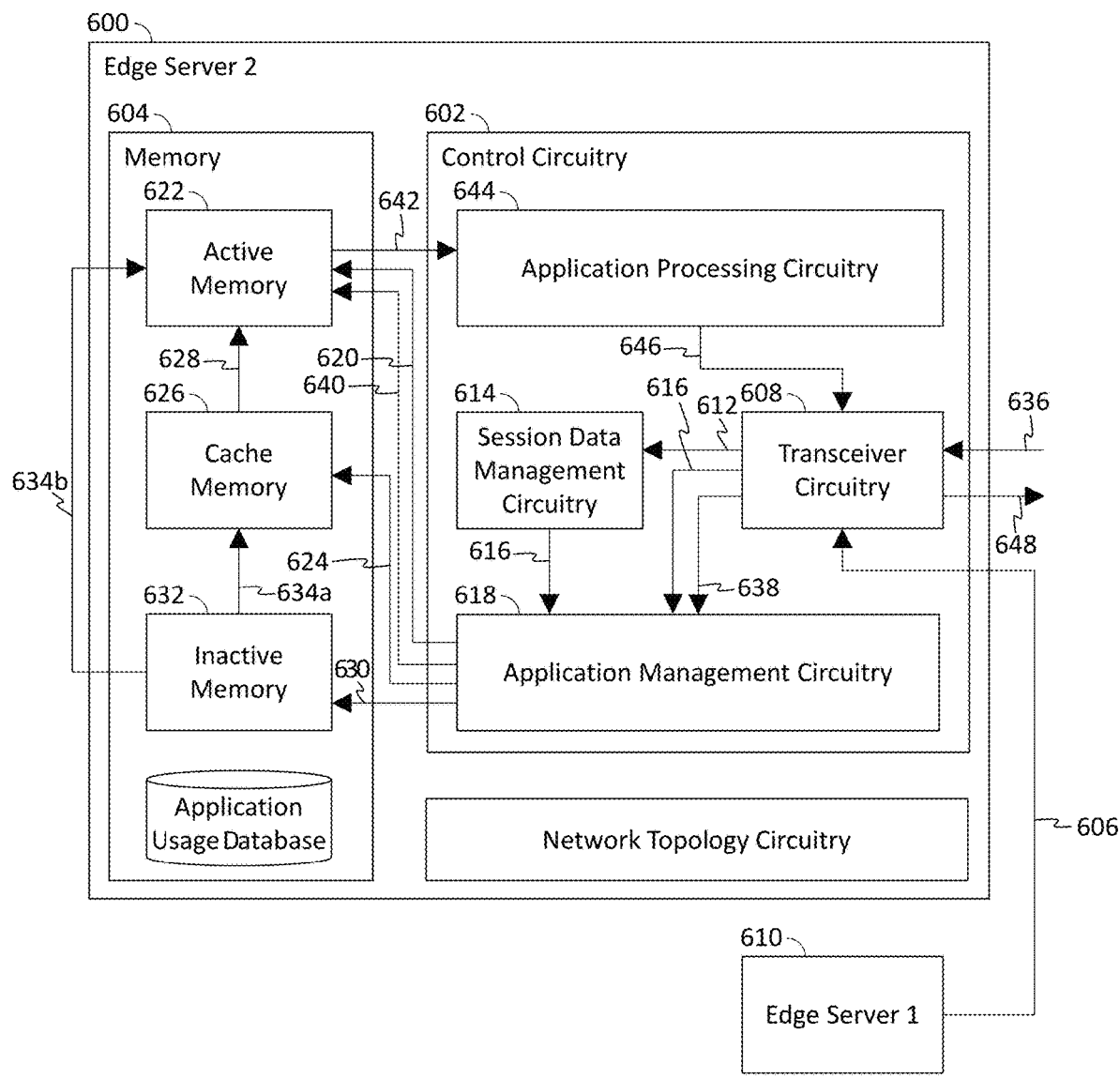
FIG. 6 is a block diagram showing components and data flow therebetween of an edge server on which an application will soon be used, in accordance with some embodiments of the disclosure.

FIG. 6 is a block diagram showing components and data flow therebetween of an edge server on which an application will soon be used, in accordance with some embodiments of the disclosure. Edge server 600 is another edge server in the same cloud computing environment as edge server 500 and includes the same components, allowing it to serve in the same capacity and perform the same functions as edge server 500. Thus, any functions described above in connection with FIG. 5 as being performed by edge server 500 may be performed by edge server 600 in cases where a user device initially connects to the cloud computing environment through edge server 600. Similarly, any functions described below in connection with FIG. 6 may be performed by edge server 500 in cases where a user device first connected to edge server 600 subsequently connects to edge server 500.

Similar to edge server 500 above, edge server 600 includes control circuitry 602 and memory 604. Control circuitry 602 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, one or more of the functions described as being performed by control circuitry 602 or any of its components may be performed by control circuitry residing on another device. For example, the functionality of edge servers in the cloud computing environment, including edge server 600, may be orchestrated by one or more hierarchically superior devices. Memory 604 may be any suitable electronic storage device such as random-access memory, read-only memory, hard drives, optical drives, solid state devices, quantum storage devices, or any other suitable fixed or removable storage devices, and/or any combination of the same.

Edge server 600 may be analogous to edge server 554 described above in connection with FIG. 5, in that edge server 600 receives 606, using transceiver circuitry 608, a transmission from another edge server 610 identifying an application being accessed by a user device that has recently connected, or will soon connect, to edge server 600. The transmission may also include session data for the application session associated with the user device. Like transceiver circuitry 524, transceiver circuitry 608 comprises a network connection over which data can be transmitted to and received from remote devices, such as an ethernet connection, WiFi connection, mobile broadband interface, or connection employing any other suitable networking protocol. Transceiver circuitry 608 in turn transmits 612 the session data to session data management circuitry 614 and transmits 616 the application identifier to application management circuitry 618.

Application management circuitry 618 determines whether the identified application is currently active at edge server 600. Application management circuitry 618 queries 620 active memory 622 to determine if the application is active. If the application is not active, application management circuitry 618 queries 624 cache memory 626 to determine if the application is currently in a memory-resident state. If the application is in a memory resident state, application management circuitry 618 brings the application out of the memory-resident state, applies parameters associated with the user device to the application, and starts a session associated with the user device for the application based on the session data received from edge server 610. Application management circuitry 618 then places 628 the application in active memory 622.

If the application is not active and is not in a memory-resident state, then application management circuitry 618 queries 630 inactive memory 632 to determine is the application is available on edge server 600. If the application is available, application management circuitry 618 launches the application. Application management circuitry 618 may then place 634a the application in cache memory 626 while associated application data is loaded and system resources are allocated. Once that process is complete, the application can be moved 628 to active memory 622. Alternatively, application management circuitry 618 may place 634b the application directly into active memory 622.

Once the user device connects to edge server 600, edge server 600 may receive 636, using transceiver circuitry 608, a request from the user device to access the application. Transceiver circuitry 608 in turn transmits 638 the request to application management circuitry 618. In response, application management circuitry 618 transmits 640 a request to active memory 622 to begin running the application. Application data is transmitted 642 from active memory 622 to application processing circuitry 644. Like application processing circuitry 542, application processing circuitry 644 may include one or more runtime environments in which various applications can be run. For example, application processing circuitry 644 may be a game engine or a VR rendering engine. Once processed and rendered for output to the user device, the application data is transmitted 646 from application processing circuitry 644 to transceiver circuitry 608. Transceiver circuitry 608 in turn transmits 648 the processed and rendered application data to the requesting user device.

In some embodiments, to further reduce lag time and buffering when the user device moves from edge server 500 to edge server 600, user inputs, session data, and other application data may be synced between edge server 500 and edge server 600 for a period of time prior to loss of connection between edge server 500 and the user device. Edge server 600 can then resume serving the application to the user device without having to wait for the most recent session data from edge server 500 to be synced.

Figure 7:
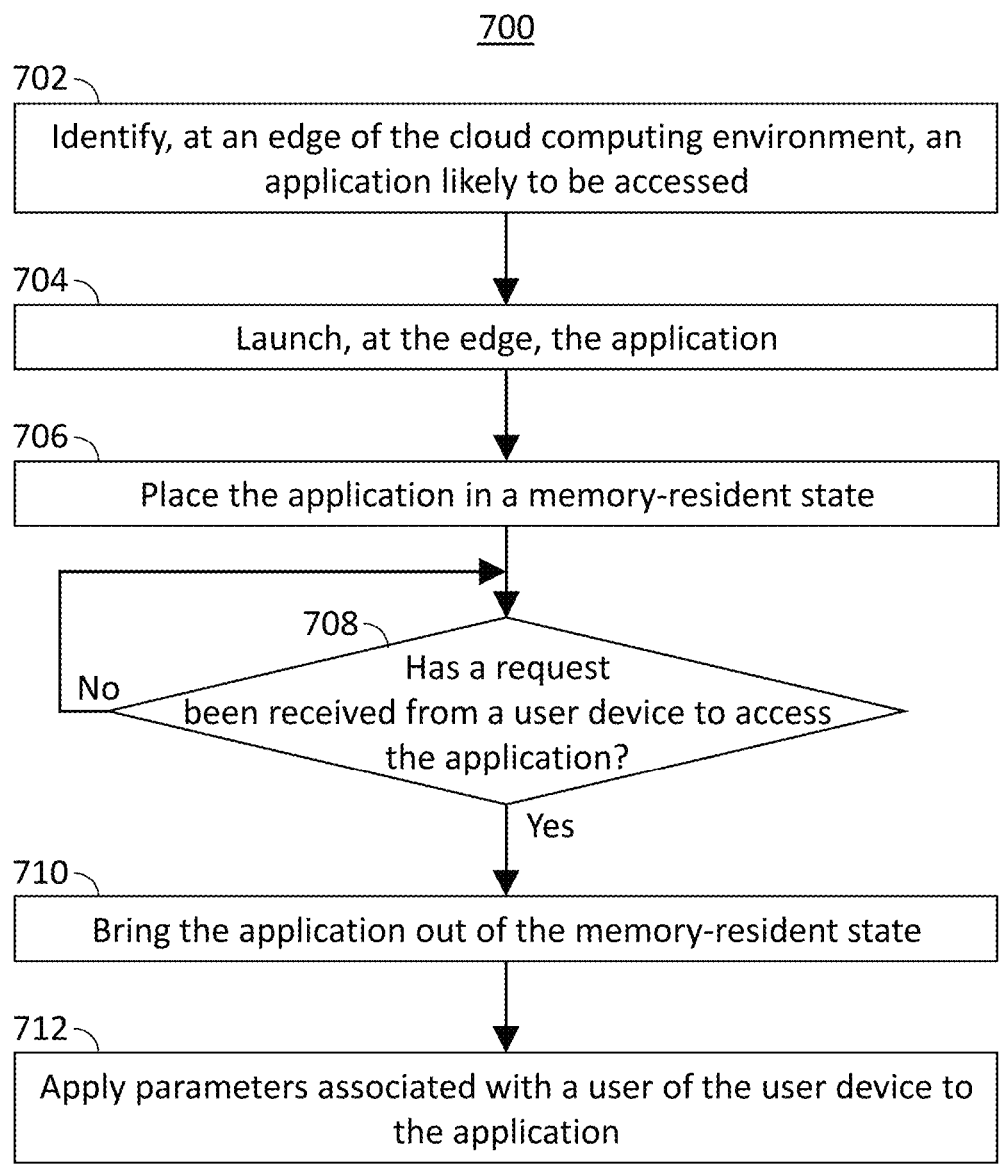
FIG. 7 is a flowchart representing an illustrative process for fast start of an application in a cloud computing environment, in accordance with some embodiments of the disclosure.

FIG. 7 is a flowchart representing an illustrative process 700 for fast start of an application in a cloud computing environment, in accordance with some embodiments of the disclosure. Process 700 may be implemented on control circuitry 502, control circuitry 602, or a combination thereof. In addition, one or more actions of process 700 may be incorporated into or combined with one or more actions of any other process or embodiment described herein.

At 702, the control circuitry identifies, at an edge of the cloud computing environment, an application likely to be accessed. This may be accomplished using methods described below in connection with FIGS. 8 and 9. At 704, the control circuitry launches, at the edge, the identified application. This may include the retrieval and loading of associated media files or other ancillary data. For example, the application may be a video game. Launching the video game may require retrieval, from memory, of cutscene videos and other cinematic content, as well as audio files for level music and sound effects. These data may be large and require significant time to retrieve and load into memory for use by the video game.

At 706, once the application is launched, the control circuitry places the application into a memory-resident state. For example, the application may be launched within a virtual machine. Once the application is fully loaded, the virtual machine is put into a sleep or hibernated state such that the loaded application can be instantly accessed when the virtual machine is awakened from the sleep or hibernated state. At 708, the control circuitry determines whether a request has been received from a user device to access the application. For example, the control circuitry may monitor incoming transmissions for application requests. If an application request is received, the specific application is identified from the request. The control circuitry then determines if the application identified in the request is the application that has been placed in the memory-resident state.

If no request has been received ("No" at 708), the control circuitry continues monitoring for such a request. If a request has been received ("Yes" at 708), then, at 710, the control circuitry brings the application out of the memory-resident state and into an active state. For example, the control circuitry may wake a virtual machine in which the application is loaded from a sleep or hibernated state. Once the application is in an active state, at 712, the control circuitry applies parameters associated with a user of the user device. For example, the control circuitry may access a user profile associated with the user. The user profile may include information related to specific applications, such as interface preferences and custom shortcuts. If the application is a video game, the user profile may include preferred music tracks, avatar preferences, and other game-related data that is not session-specific.

The actions or descriptions of FIG. 7 may be used with any other embodiment of this disclosure. In addition, the actions and descriptions described in related to FIG. 7 may be done in suitable alternative orders or in parallel to further the purposes of this disclosure.

Figure 8:
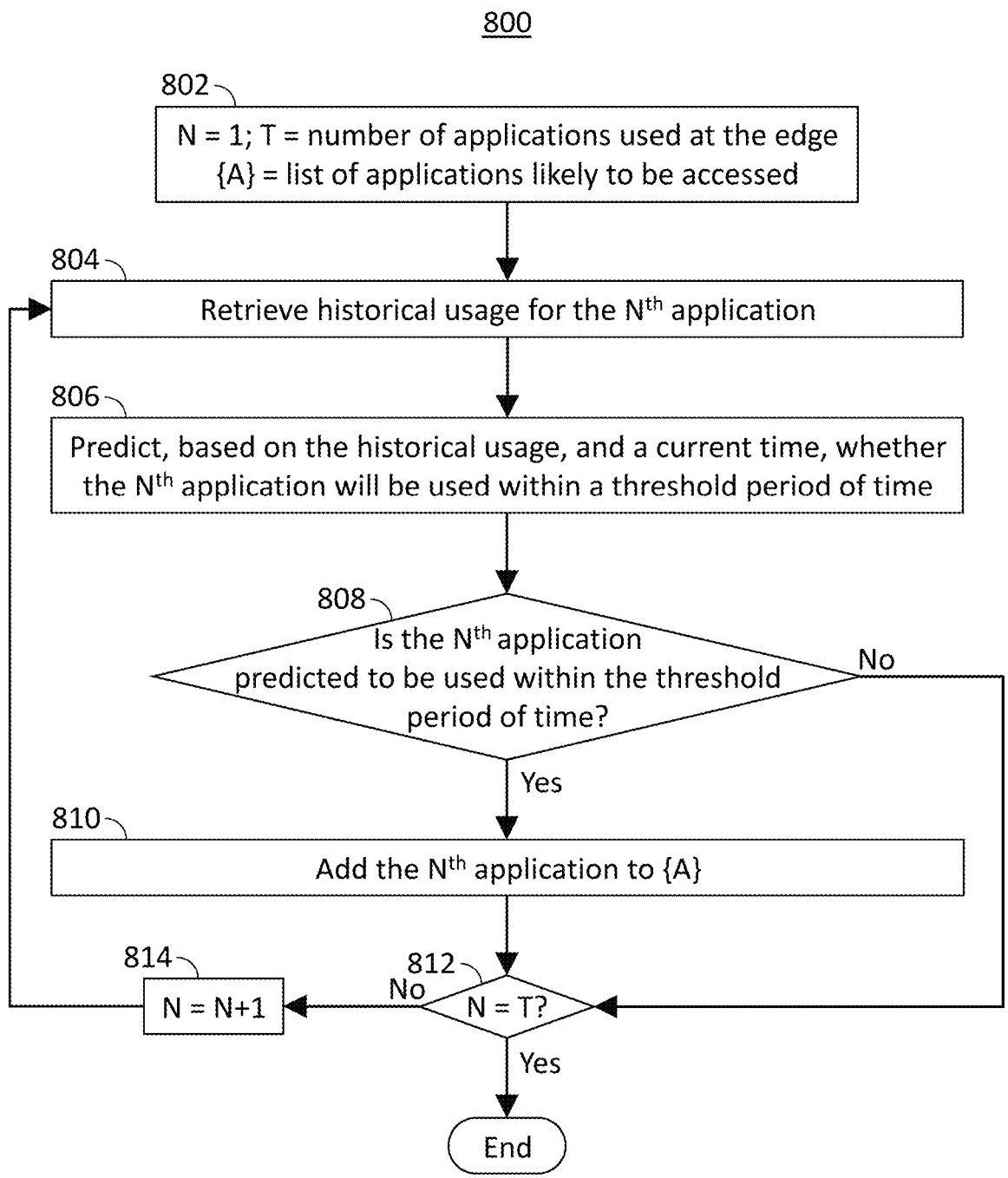
FIG. 8 is a flowchart representing an illustrative process for determining that an application will likely be accessed within a threshold period of time, in accordance with some embodiments of the disclosure.

FIG. 8 is a flowchart representing an illustrative process 800 for determining that an application will likely be accessed within a threshold period of time, in accordance with some embodiments of the disclosure. Process 800 may be implemented on control circuitry 502, control circuitry 602, or a combination thereof In addition, one or more actions of process 800 may be incorporated into or combined with one or more actions of any other process or embodiment described herein.

At 802, the control circuitry initializes a counter variable N, settings its value to one, a variable T representing the number of applications used at the edge, and an array or data structure {A} representing a list of applications likely to be accessed. At 804, the control circuitry retrieves historical usage for the $N^{th}$ application. The historical usage data may include number of user devices that have accessed the $N^{th}$ application at various times of day, application popularity as a ratio of user devices that accessed the $N^{th}$ application at a given time to total number of user devices connected to the edge server at that time, or any other data or records that indicate usage patterns for the $N^{th}$ application. At 806, the control circuitry predicts, based on the historical usage data and the current time, whether the $N^{th}$ application will be accessed within a threshold period of time, such as ten minutes, fifteen minutes, or thirty minutes, depending on overall system resources available at the edge server. For example, based on the historical usage data, it may be predicted that the $N^{th}$ application will be accessed by one or more user devices for a period of one hour beginning at noon. If the current time is 10:00am, it may be a waste of system resources to launch the $N^{th}$ application and keep it in a memory-resident state for two hours before any user device requests access to it. However, if the current time is 11:45am, it is likely that at least one user device will request access to the $N^{th}$ application within fifteen minutes.

At 808, the control circuitry determines whether the $N^{th}$ application is predicted to be used within the threshold period of time. If so ("Yes" at 808), then, at 810, the control circuitry adds the $N^{th}$ application, or an identifier thereof, to {A}. After adding the $N^{th}$ application to {A}, or if the $N^{th}$ application is not predicted to be used within the threshold period of time ("No" at 808), at 812, the control circuitry determines whether N is equal to T, meaning that usage of all available applications has been predicted. If N is not equal to T ("No" at 812), then, at 814, the control circuitry increments that value of N by one, and processing returns to 804. If N is equal to T ("Yes" at 812), then the process ends. In some embodiments, the control circuitry may wait for a period of time and then repeat process 800.

The actions or descriptions of FIG. 8 may be used with any other embodiment of this disclosure. In addition, the actions and descriptions described in related to FIG. 8 may be done in suitable alternative orders or in parallel to further the purposes of this disclosure.

Figure 9:
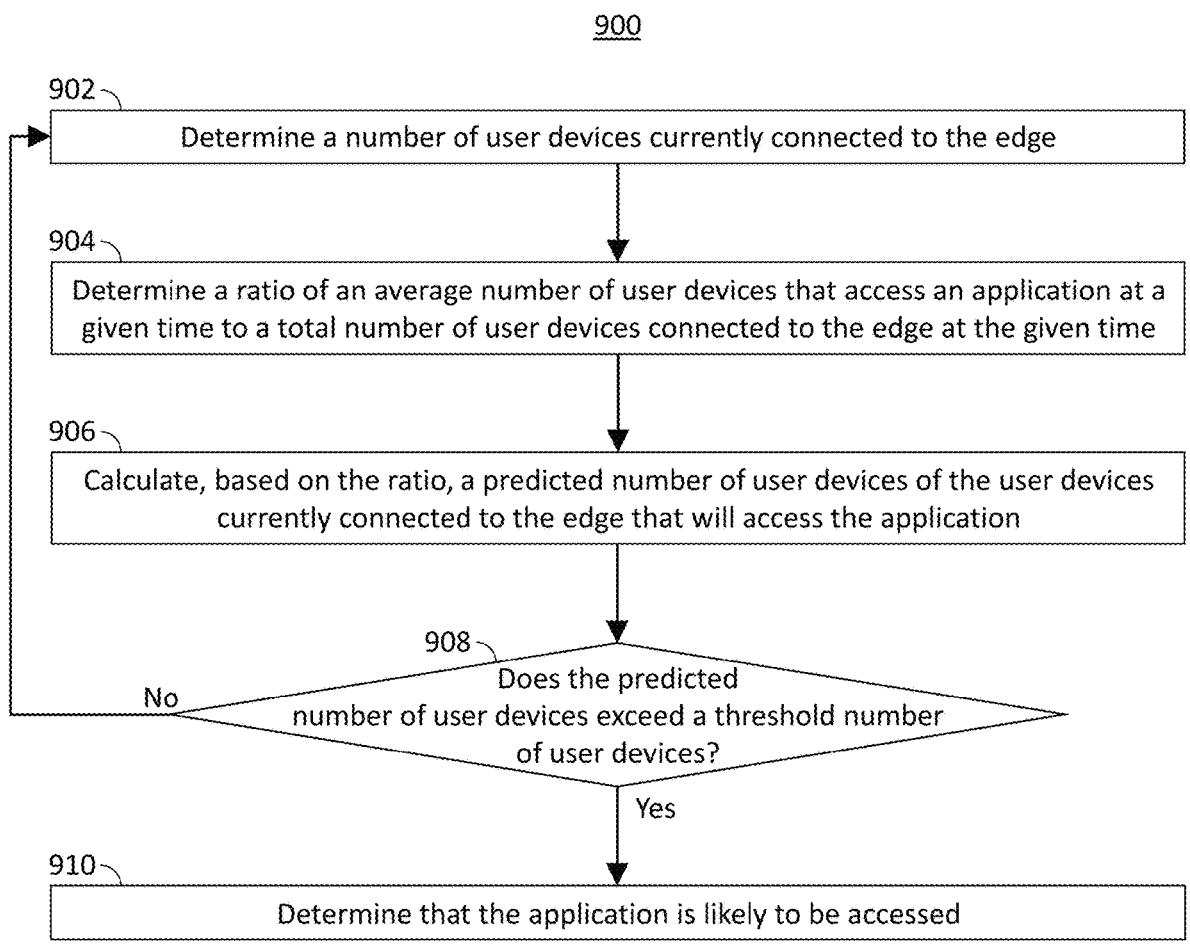
FIG. 9 is a flowchart representing a second illustrative process for determining that an application will likely be accessed within a threshold period of time, in accordance with some embodiments of the disclosure.

FIG. 9 is a flowchart representing a second illustrative process 900 for determining that an application will likely be accessed within a threshold period of time, in accordance with some embodiments of the disclosure. Process 900 may be implemented on control circuitry 502, control circuitry 602, or a combination thereof In addition, one or more actions of process 900 may be incorporated into or combined with one or more actions of any other process or embodiment described herein.

At 902, the control circuitry determines a number of user devices currently connected to the edge. For example, the control circuitry may track the number simultaneous connections made with external devices. At 904, the control circuitry determines a ratio of an average number of user devices that access an application at a given time to a total number of user devices connected to the edge at that given time. If, for example, out of one hundred user devices connected to the edge at noon, an average of thirty users access a particular application, the ratio is determined to be 3:10. At 906, the control circuitry calculates, based on the ratio, a predicted number of user devices of the user devices currently connected to the edge that will access the application. For example, based on the 3:10 ratio above, the control circuitry may predict that three hundred user devices out of one thousand user devices currently connected to the edge will access the application.

At 908, the control circuitry determines whether the predicted number of user devices exceeds a threshold number of user devices. In order to conserve system resources, the edge server may not preemptively launch a resource-intensive application unless a sufficiently large number of user devices is predicted to access that application. If the predicted number of user devices does not exceed the threshold ("No" at 908), then processing returns to 902. If the predicted number does exceed the threshold ("Yes" at 908), then, at 910, the control circuitry determines that the application is likely to be accessed.

The actions or descriptions of FIG. 9 may be used with any other embodiment of this disclosure. In addition, the actions and descriptions described in related to FIG. 9 may be done in suitable alternative orders or in parallel to further the purposes of this disclosure.

Figure 10:
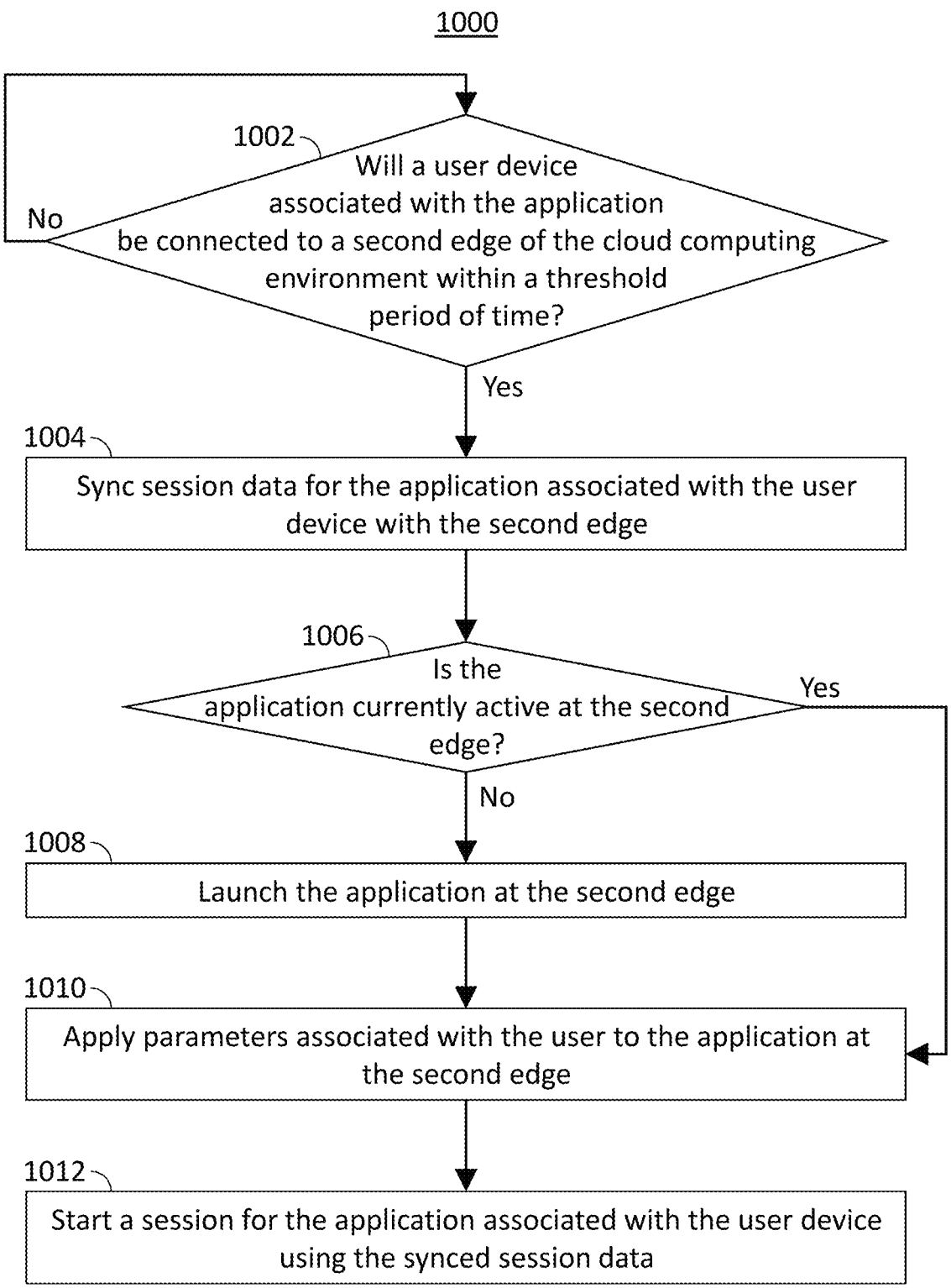
FIG. 10 is a flowchart representing an illustrative process for transferring an active application session from a first edge of a cloud computing environment to a second edge of the cloud computing environment, in accordance with some embodiments of the disclosure.

FIG. 10 is a flowchart representing an illustrative process 1000 for transferring an active application session from a first edge of a cloud computing environment to a second edge of the cloud computing environment, in accordance with some embodiments of the disclosure. Process 1000 may be implemented on control circuitry 502, control circuitry 602, or a combination thereof In addition, one or more actions of process 1000 may be incorporated into or combined with one or more actions of any other process or embodiment described herein.

At 1002, the control circuitry determines whether a user device associated with an application at a first edge will be connected to a second edge of the cloud computing environment within a threshold period of time. For example, the control circuitry may use positioning and movement data from each user device (e.g. GPS location data, accelerometer data, inertial motion data) or may derive a position for each user device based on signal strength of the connection with each device and directionality of the signal. Signal strength of the connection between each device can be sampled at multiple intervals such that changes in signal strength resulting from changes in position of a user device can be used to triangulate the position of the user device and extrapolate a path of movement of the user device. Once the position and movement of the user device have been determined, the control circuitry can determine whether the user device will move out of transmission range of the first edge and into transmission range of the second edge and, if so, how much time will elapse before the user device loses its connection with the first edge and connects to the second edge. The control circuitry may compare this time to a threshold amount of time, such as one minute. If the user device will be connected to the second edge within the threshold period of time ("Yes" at 1002), then, at 1004, the control circuitry syncs session data for the application associated with the user device with the second edge. For example, the first edge may transmit session data to the second edge. The first edge may make a single transmission, or may maintain a continuous transmission (e.g., a data stream) with the second edge to provide live session data to the second edge as a user of the user device continues to interact with the application.

At 1006, the control circuitry determines whether the application is currently active at the second edge. This may be accomplished using methods described above in connection with FIGS. 5 and 6. If the application is not currently active at the second edge ("No" at 1006), then, at 1008, the control circuitry launches the application at the second edge. Once the application is launched, or if the application is already active at the second edge ("Yes" at 1006), at 1010, the control circuitry applies parameters associated with the user to the application at the second edge. This may include user preferences for the application that are not specific to the current session. At 1012, the control circuitry starts a session at the second edge for the application associated with the user device using the synced session data.

The actions or descriptions of FIG. 10 may be used with any other embodiment of this disclosure. In addition, the actions and descriptions described in related to FIG. 10 may be done in suitable alternative orders or in parallel to further the purposes of this disclosure.

Figure 11:
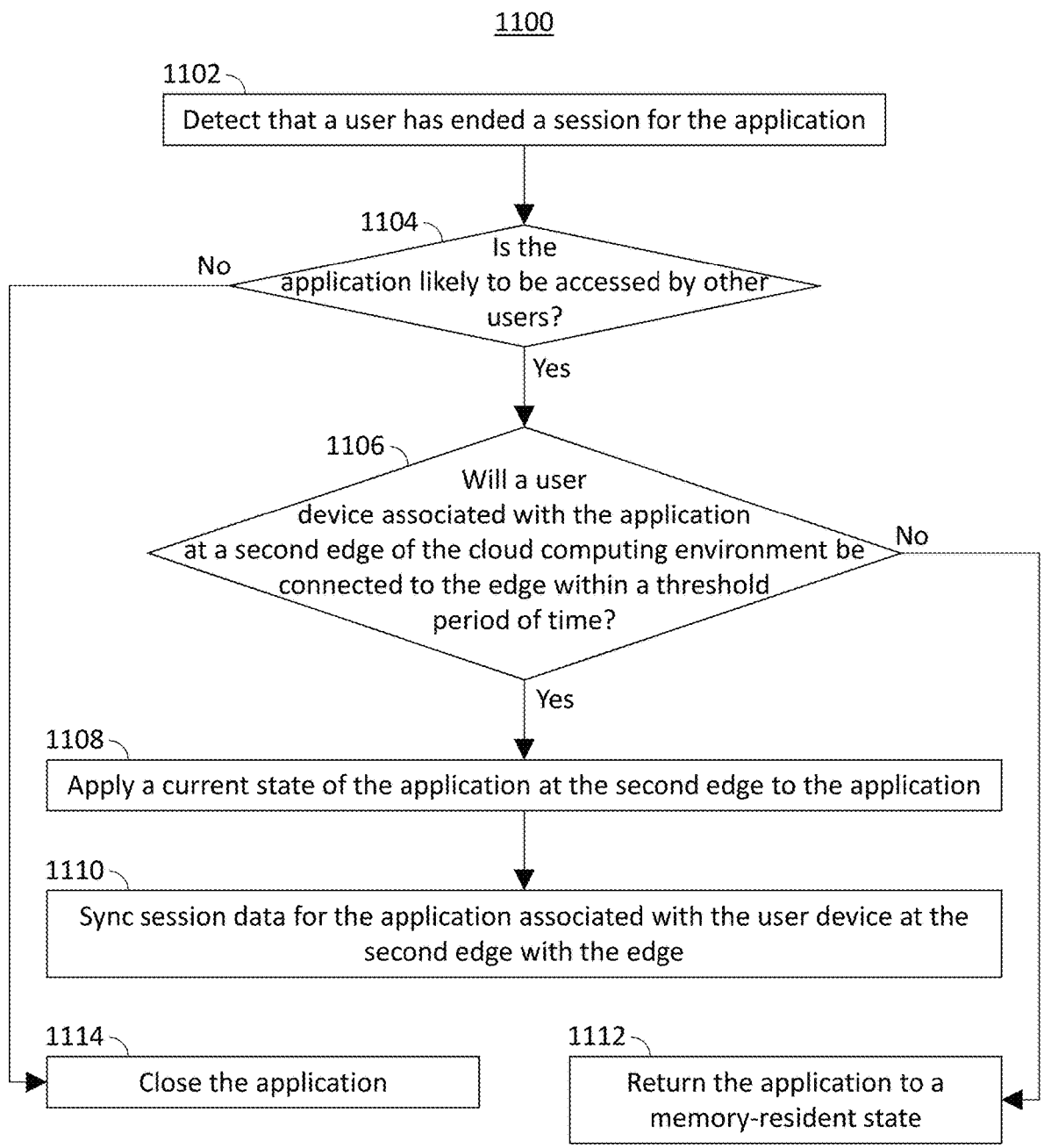
FIG. 11 is a flowchart representing an illustrative process for managing an application at the end of an application session, in accordance with some embodiments of the disclosure.

FIG. 11 is a flowchart representing an illustrative process 1100 for managing an application at the end of an application session, in accordance with some embodiments of the disclosure. Process 1100 may be implemented on control circuitry 502, control circuitry 602, or a combination thereof. In addition, one or more actions of process 1100 may be incorporated into or combined with one or more actions of any other process or embodiment described herein.

At 1102, the control circuitry detects that a user has ended a session for the application. For example, the control circuitry may detect that the user device is no longer connected to the cloud computing environment through any edge server. Alternatively, an application termination signal may be received from the user device. At 1104, the control circuitry determines whether the application is likely to be accessed by other users. This may be accomplished using methods described above in connection with FIGS. 8 and 9. If the application is likely to be accessed by other users ("Yes" at 1104), then, at 1104, the control circuitry determines whether a user device associated with the application at a second edge of the cloud computing environment will be connected to the edge within a threshold period of time. This may be accomplished using methods described above in connection with FIG. 10. If a user device associated with the application at a second edge of the cloud computing environment will be connected to the edge within the threshold period of time ("Yes" at 1106), then, at 1108, the control circuitry applies a current state of the application at the second edge to the application. The control circuitry then, at 1110, syncs session data for the application associated with the user device at the second edge with the edge. This may be accomplished using methods described above in connection with FIG. 10. If another user device associated with the application at a second edge will not be connected to the edge within the threshold period of time ("No" at 1106), then, at 1112, the control circuitry returns the application to a memory resident state. If, however, the application is no longer likely to be accessed by other users ("No" at 1104), then, at 1114, the control circuitry closes the application.

The actions or descriptions of FIG. 11 may be used with any other embodiment of this disclosure. In addition, the actions and descriptions described in related to FIG. 11 may be done in suitable alternative orders or in parallel to further the purposes of this disclosure.

In some embodiments, a user device may switch between different cloud computing environments. For example, the user device may be a mobile device (e.g., a smartphone) that is initially connected to an edge of a mobile broadband network (e.g., a 5G network). The user device may move within range of a wireless network (e.g. WiFi) access point. Many mobile devices are configured to prefer transmitting data over a WiFi connected to mobile broadband connections, as many subscription plans limit the amount of data a user can transmit or receive. If the user device moves into range of a WiFi access point, the mobile broadband network edge may initiate any of the above-described processes with an edge server that serves the WiFi access point.

In some embodiments, application sessions may be transferred between user devices. For example, a first user device may be a mobile device with limited available power. If the power falls too low, the device may shut down while the user is still trying to use the application. If a second user device associated with the same user is located in proximity to the first user device (e.g., a device that supports accessing the application, such as a gaming console that is on the same network as the first device, e.g., on the same LAN), then the first device may transmit an intent-to-switch signal to the edge server, in order to initiate the switch. For example, an intent-to-switch signal or IP packet(s) contains information to inform the edge server or a QoS service associated with the edge server (or service the application is utilizing) of a need to initiate the switch. Such packet can include information about the second device, such as its destination IP address or other unique address such as a MAC address, to allow the edge server to initiate a connection with the second user device and sync session data for the application with the second user device in a similar manner to that described above in connection with FIG. 10. The user can then use the second user device to continue using the application. Alternatively, the application running on the first device can prompt the user (in response to the battery level falling below a predefined threshold, such as 20%), to initiate such switch. The application might user other parameters to prompt the user to switch. For example, the application might prompt the user to switch in response to the battery level falling below a predefined threshold and in response to detecting that the application (e.g., gaming application) completed a level and is ready to launch the next level. In one embodiment, the prompt to switch or transfer an existing session to another device is simply presented to the user in response to determining that a second device is available for user access, and that second device features faster hardware or could provide a better user experience (e.g., features a larger screen or is connected to a larger screen, such as a TV). For example, in response to detecting that a PS5 is available at the user location (e.g., on the same Wi-Fi network as the first user device), the prompt might be displayed immediately or after the current level of a game has been completed, or during a cutscene, or in response to the user launching a menu (e.g., a map to explore the level of the game that the user is playing). The detection and prompt to switch can be distributed based on the parameter (s) used to initiate such switch. For example, the mobile device might check in response to the battery level falling below a predefined threshold, if a second compatible device or devices is/are present and prompt the user to choose a device in order to communicate such information to the edge service or the QoS service mentioned above. However, the prompt could also be triggered by the QoS service or edge computing server as well, based on the user's devices detected or already stored in the user device.

Local network privacy controls are native to many operating systems (e.g., iOS 14). Applications that are granted access by the user are capable of collecting information about nearby devices and create a profile to store such information. For example, iOS devices utilize Apple's Bonjour service discovery to allow applications to discover nearby services and advertise its own services. The available device types (e.g., PS5) on the local area network allow the QoS service access to such information to recommend switching to another device. Thus, available devices in the user's profile can be prioritized based on hardware specifications and user experience levels and sorted accordingly. In such case, the QoS service can always check for the first device on the list (a device that is different from the current device being utilized by the user).

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for fast start of applications in a cloud computing environment, the method comprising:
   identifying, at an edge of the cloud computing environment, an application likely to be accessed;
   launching, at the edge, the application;
   placing the application in a memory-resident state;
   receiving a request from a user device to access the application; and
   in response to receiving the request to access the application:
     bringing the application out of the memory-resident state; and
     applying parameters associated with a user of the user device to the application.

2. The method of claim 1, wherein identifying, at an edge of the cloud computing environment, an application likely to be accessed comprises:
   retrieving historical usage for a plurality of applications at the edge; and
   predicting, based on the historical application usage and a current time, that at least one application of the plurality of applications will be used within a threshold period of time.

3. The method of claim 1, wherein identifying, at an edge of the cloud computing environment, an application likely to be accessed comprises:
   determining a number of user devices currently connected to the edge; and
   determining a ratio of an average number of user devices that access an application at a given time to a total number of user devices connected to the edge at the given time;
   calculating, based on the ratio, a predicted number of user devices of the user devices currently connected to the edge that will access the application; and
   determining whether the predicted number of user devices exceeds a threshold number of user devices.

4. The method of claim 1, wherein launching, at the edge, the application comprises:
   initializing a virtual machine to host the application; and
   loading, into the virtual machine, all data associated with the application.

5. The method of claim 4, wherein:
   placing the application in a memory-resident state comprises placing the virtual machine in a hibernated state; and
   bringing the application out of the memory-resident state comprises waking the virtual machine from the hibernated stated.

6. The method of claim 1, further comprising:
   determining whether a user device associated with the application will be connected to a second edge of the cloud computing environment within a threshold period of time; and
   in response to determining that the user device associated with the application will be connected to the second edge within the threshold period of time, syncing session data for the application associated with the user device with the second edge.

7. The method of claim 6, further comprising:
   determining whether the application is currently active at the second edge;
   in response to determining that the application is currently active at the second edge, starting a session for the application associated with the user device at the second edge using the synced session data; and
   in response to determining that the application is not currently active at the second edge:
     launching the application at the second edge;
     applying parameters associated with the user to the application at the second edge; and
     starting a session for the application associated with the user device at the second edge using the synced session data.

8. The method of claim 1, further comprising:
   detecting that the user has ended a session for the application; and
   determining whether the application is likely to be accessed by other users.

9. The method of claim 8, further comprising:
in response to determining that the application is no longer likely to be accessed by other users, closing the application.

10. The method of claim 8, further comprising:
in response to determining that the application is likely to be accessed by other users:
determining whether a user device associated the application at a second edge of the cloud computing environment will be connected to the edge within a threshold period of time;
in response to determining that a user device associated with the application at the second edge of the cloud computing environment will be connected to the edge within the threshold period of time:
applying a current state of the application at the second edge to the application; and
syncing session data for the application associated with the user device at the second edge with the edge; and
in response to determining that a user device associated with the application at the second edge of the cloud computing environment will not be connected to the edge within the threshold period of time, returning the application to the memory-resident state.

11. A system for fast start of applications in a cloud computing environment, the system comprising:
input/output circuitry; and
control circuitry configured to:
identify, at an edge of the cloud computing environment, an application likely to be accessed;
launch, at the edge, the application;
place the application in a memory-resident state;
receive, using the input/output circuitry, a request from a user device to access the application; and
in response to receiving the request to access the application:
bring the application out of the memory-resident state; and
apply parameters associated with a user of the user device to the application.

12. The system of claim 11, wherein the control circuitry configured to identify, at an edge of the cloud computing environment, an application likely to be accessed is further configured to:
retrieve historical usage for a plurality of applications at the edge; and
predict, based on the historical application usage and a current time, that at least one application of the plurality of applications will be used within a threshold period of time.

13. The system of claim 11, wherein the control circuitry configured to identify, at an edge of the cloud computing environment, an application likely to be accessed is further configured to:
determine a number of user devices currently connected to the edge; and
determine a ratio of an average number of user devices that access an application at a given time to a total number of user devices connected to the edge at the given time;
calculate, based on the ratio, a predicted number of user devices of the user devices currently connected to the edge that will access the application; and
determine whether the predicted number of user devices exceeds a threshold number of user devices.

14. The system of claim 11, wherein the control circuitry configured to launch, at the edge, the application is further configured to:
initialize a virtual machine to host the application; and
load, into the virtual machine, all data associated with the application.

15. The system of claim 14, wherein:
the control circuitry configured to place the application in a memory-resident state is further configured to place the virtual machine in a hibernated state; and
the control circuitry configured to bring the application out of the memory-resident state is further configured to wake the virtual machine from the hibernated stated.

16. The system of claim 11, wherein the control circuitry is further configured to:
determine whether a user device associated with the application will be connected to a second edge of the cloud computing environment within a threshold period of time; and
in response to determining that the user device associated with the application will be connected to the second edge within the threshold period of time, sync session data for the application associated with the user device with the second edge.

17. The system of claim 16, wherein the control circuitry is further configured to:
determine whether the application is currently active at the second edge;
in response to determining that the application is currently active at the second edge, start a session for the application associated with the user device at the second edge using the synced session data; and
in response to determining that the application is not currently active at the second edge:
launch the application at the second edge;
apply parameters associated with the user to the application at the second edge; and
start a session for the application associated with the user device at the second edge using the synced session data.

18. The system of claim 11, wherein the control circuitry is further configured to:
detect that the user has ended a session for the application; and
determine whether the application is likely to be accessed by other users.

19. The system of claim 18, wherein the control circuitry is further configured to:
in response to determining that the application is no longer likely to be accessed by other users, close the application.

20. The system of claim 18, wherein the control circuitry is further configured to:
in response to determining that the application is likely to be accessed by other users:
determine whether a user device associated the application at a second edge of the cloud computing environment will be connected to the edge within a threshold period of time;
in response to determining that a user device associated with the application at the second edge of the cloud computing environment will be connected to the edge within the threshold period of time:
apply a current state of the application at the second edge to the application; and sync session data for the application associated with the user device at the second edge with the edge; and in response to determining that a user device associated with the application at the second edge of the cloud computing environment will not be connected to the edge within the threshold period of time, return the application to the memory-resident state.

\* \* \* \* \*